(12) United States Patent
Peterson et al.

(10) Patent No.: US 6,330,346 B1
(45) Date of Patent: *Dec. 11, 2001

(54) METHOD AND APPARATUS FOR SUBCUTANEOUS IDENTIFICATION

(75) Inventors: Dwight C. Peterson; Donald W. Jackson, both of Puyallup; John A. Stiver, Auburn, all of WA (US)

(73) Assignee: Advanced Biometrics, Inc., Puyallup, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,027

(22) Filed: Aug. 10, 1998

Related U.S. Application Data

(63) Continuation-in-part of application No. 08/521,796, filed on Aug. 31, 1995, now Pat. No. 5,793,881.

(51) Int. Cl.[7] .......................................................... G06K 9/00
(52) U.S. Cl. ............................ 382/115; 382/124; 382/129
(58) Field of Search ..................................... 382/115, 129, 382/124; 340/825.34; 606/185

(56) References Cited

U.S. PATENT DOCUMENTS

| | | | |
|---|---|---|---|
| 3,648,240 | 3/1972 | Jacoby et al. | 340/146.3 |
| 4,467,545 | 8/1984 | Shaw, Jr. | 42/70 R |
| 4,699,149 | 10/1987 | Rice | 128/664 |
| 4,785,171 | 11/1988 | Dowling, Jr. et al. | 250/227 |
| 4,857,916 | 8/1989 | Bellin | 340/825.34 |
| 4,932,776 | 6/1990 | Dowling, Jr. et al. | 356/71 |
| 4,946,276 | 8/1990 | Chilcott | 356/71 |
| 5,088,817 | 2/1992 | Igaki et al. | 356/71 |
| 5,103,486 | 4/1992 | Grippi | 382/4 |
| 5,230,025 | 7/1993 | Fishbine et al. | 382/4 |
| 5,335,288 | 8/1994 | Faulkner | 382/4 |
| 5,351,303 | 9/1994 | Willmore | 382/2 |
| 5,546,471 | 8/1996 | Merjanian | 382/124 |
| 5,569,291 | * 10/1996 | Privitera et al. | 606/185 |
| 5,787,185 | * 7/1998 | Clayden | 382/115 |

* cited by examiner

Primary Examiner—Jose L. Couso
Assistant Examiner—Anh Hong Do
(74) Attorney, Agent, or Firm—Jensen & Puntigam, P.S.

(57) ABSTRACT

Apparatus for non-invasive reading of subcutaneous material, including in one package light emitters of a wavelength capable of illuminating subcutaneous material, light detecting elements responsive to the illuminated material and prerecorded material, whereby the apparatus makes a comparison between the currently illuminated material and the prerecorded material.

7 Claims, 4 Drawing Sheets

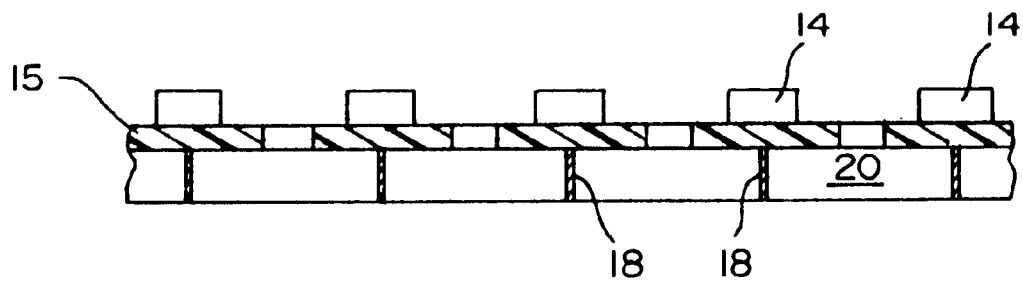
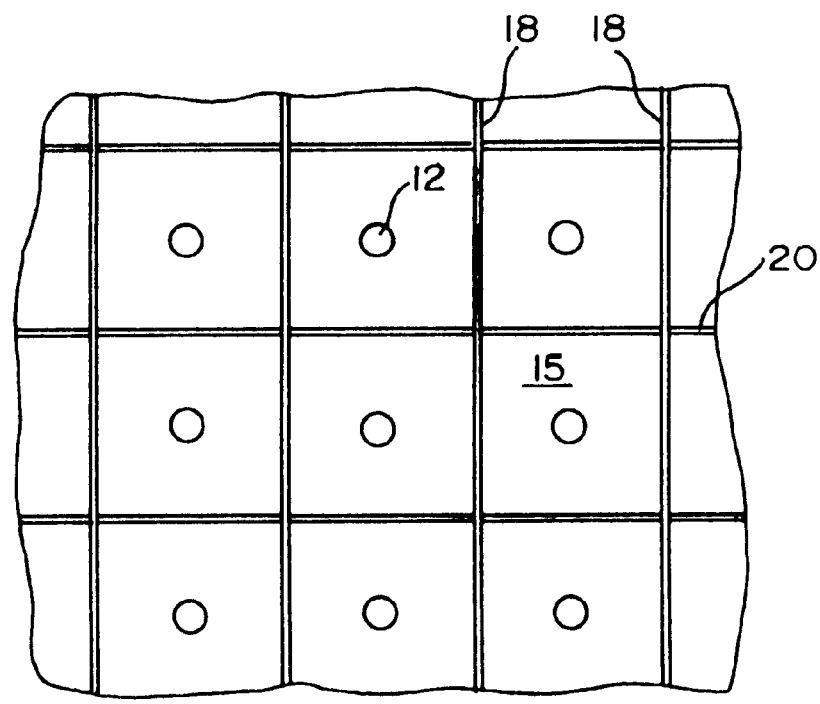

US 6,330,346 B1

METHOD AND APPARATUS FOR SUBCUTANEOUS IDENTIFICATION

This application is a continuation-in-part of U.S. patent application Ser. No. 08/521,796, filed Aug. 31, 1995 entitled "IDENTIFICATION SYSTEM", U.S. Pat. No. 5,793,881, and incorporates that disclosure by reference.

TECHNICAL FIELD

The present invention deals with an identification system including a non-invasive means and apparatus for quickly and inexpensively detecting the subcutaneous conditions and/or structure of a living organism, making an instantaneous comparison with a predetermined standard electronically and providing a means for either automatic or human decision-making based upon the comparative data. In particular, the current invention provides a means for illuminating subcutaneous structure and/or conditions and through a means for reading the illuminated subcutaneous conditions compares these conditions with a prerecorded and stored set of conditions such that any variance from the stored conditions is immediately obvious and becomes a source of facts for decision-making.

BACKGROUND OF THE INVENTION

As was disclosed in the co-pending application, means for surface detecting of identification for security purposes is well known; and although these methods have become more sophisticated, those wishing to subvert the system have likewise become more sophisticated; and since identification means deals with surface phenomena, these characteristics can in fact be altered. More sophisticated means of identification have likewise been developed, including the reading and comparison of the features of a person's eye.

It has been determined, however, that a rapid, non-invasive way of detecting subcutaneous structure and/or conditions likewise will serve to provide a reliable, not easily tampered with detection system. In addition to the grasping method as disclosed in the co-pending application, which relied upon mechanical scanning, it has been determined that scanning electronically is both more reliable and less expensive, and further, if an array of light-emitting means interspersed with detecting means can be placed in a flexible mat, this can be used or readily placed in a large variety of structures without a great deal of physical alteration.

The structures in which a pre-assembled flexible mat are envisioned as being used include guns; parts of an automobile including door handles, gear shifts, and/or steering wheels; means associated with computers, including keyboards and/or joy sticks or the mouse; and certainly apparatus involved in the transfer of money or other high security transactions.

SUMMARY OF THE INVENTION

With the above-noted prior art in mind, it is an object of the present invention to provide an identification system wherein a plurality of pre-assembled security units including a light-emitting source capable of reading subdermal characteristics of the body are interspersed with detecting devices capable of reading the illuminated characteristics and means for transmitting this information to a pre-recorded database, wherein the characteristics are compared with the database for decision-making.

Yet another object of the present invention is to provide a plurality of light-emitting elements arranged in an array with light-detecting elements in a flexible mat which includes means to prevent cross-reading of the illuminated images, and wherein the mat can be manufactured or cut to predetermined size and/or shape permitting the application to a variety of objects, adapting them for identification purposes.

Yet another object of the present invention is to provide a flexible multi-layer mat wherein one layer contains the light-emitting source and another layer contains the light-detection element, and wherein these layers are separated by a third layer which not only separates the two previous layers, but controls the field read by the light-detection means.

Still a further object of the present invention is to provide a device capable of reading subcutaneous objects and characteristics in a large variety of installations.

BRIEF DESCRIPTION OF THE DRAWINGS

FIG. 4 is a partial cross-section of the mask to further limit the field of view of each sensor.

FIG. 5 is a partial bottom view of the mask.

BEST MODE OF CARRYING OUT THE INVENTION

Figure 1:
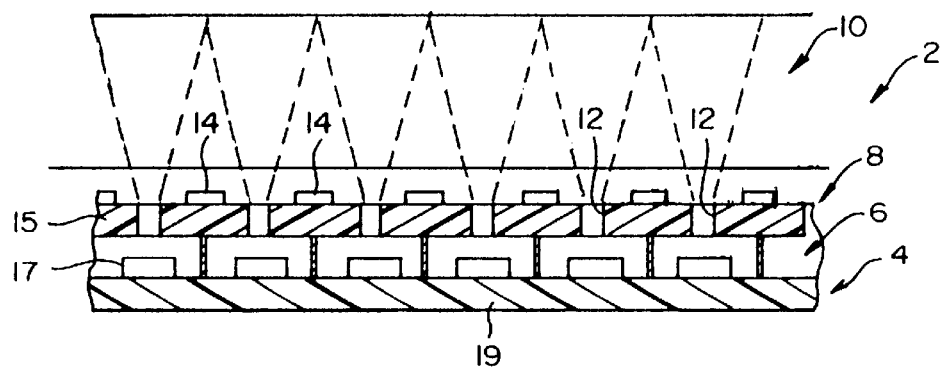
FIG. 1 is a cross-section view through a thin grip sensor mat of the present invention.

As seen in FIG. 1, the thin grip sensor generally designated as 2 comprises four main layers, the sensor array 4, the mask 6, the LED array 8 and the window 10. It is to be emphasized that the surface window which is contacted by the hand and fingers is most likely ¹⁄₁₀" to ⅛" thick of a flexible, transparent material, and the total thin grip sensor array is less than ¼" thick. As seen in FIG. 1, a plurality of infrared light-emitting diodes 14 are arranged, as is explained in detail hereinafter, such that they provide relatively even and continuous illumination of the object. The sensor array which is spaced by the mask 6 and located beneath the field of view limiting holes 12 assures that there is no cross-feed which might distort the image.

Figure 2:
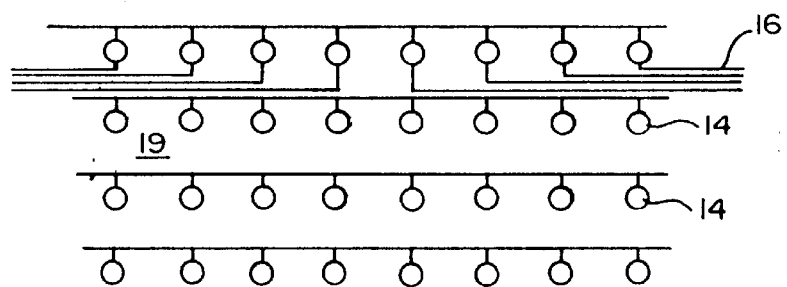
FIG. 2 is a plan view of the sensor array.

Also seen in FIG. 1, the sensor array comprises a matrix of light detectors 17, either diodes or transistors, with a minimum density of 625 elements per square inch arranged in a square matrix, as shown on an opaque substrate 19 and includes the necessary traces 16 see FIG. 2 . The total size of the matrix is variable limited only by the ability to route the traces. The substrate also serves as the PC board (probably multi-layered for the sensor array).

Figure 3:
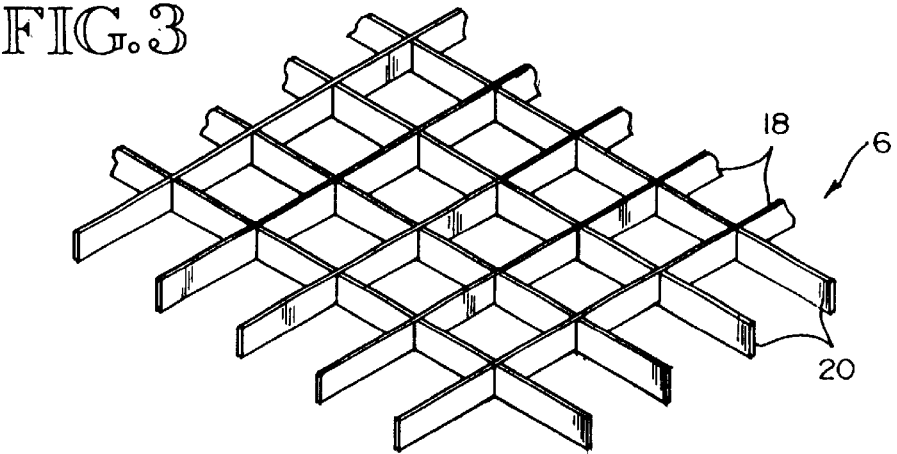
FIG. 3 is a partial isometric view of a mask utilized in the present invention.

The mask as seen in FIG. 3 is an opaque lattice-like shield which prevents cross-talk, i.e. it keeps light which is intended for one particular sensor from being detected by neighboring sensors. The mask is placed over the sensor array and also provides vertical separation between the sensor and the pinholes 12.

As seen in FIGS. 3 and 4, the latticework 6 comprises relatively normal walls 18, 20 made of an opaque material which prevents overlap of detection by sensors, and likewise as best seen in FIG. 1 places a physical separation between the sensors 17 and the pinholes 12 which are field-of-view limiting and located between the LED array.

FIG. 5 depicts the grid in place from the bottom and the relationship between the walls 18, 20 of the grid. The substrate 15 for the LEDs 14 and the pinhole 12 relationship can readily be seen.

Figure 6:
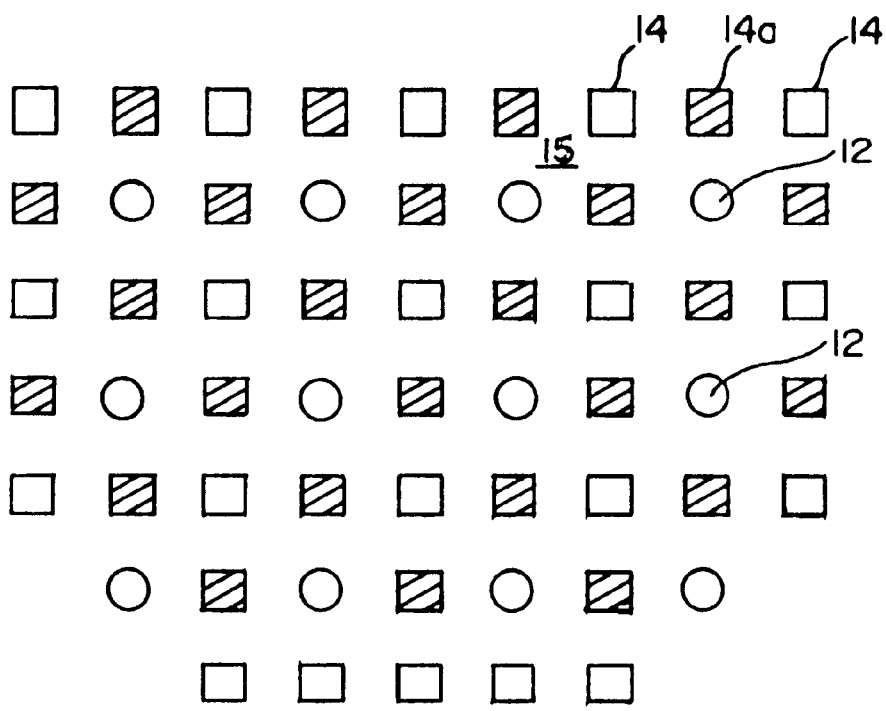
FIG. 6 is partial top view of the LED array.

As seen in FIG. 6, the top view of the LED grid can be seen showing the relationships between the LEDs and the pinholes 12. It is to be noted that in this grid the LEDs are divided into two wavelengths, 14 being of 720–750 nanometers and 14a between 850 and 1000 nanometers.

Figure 7:
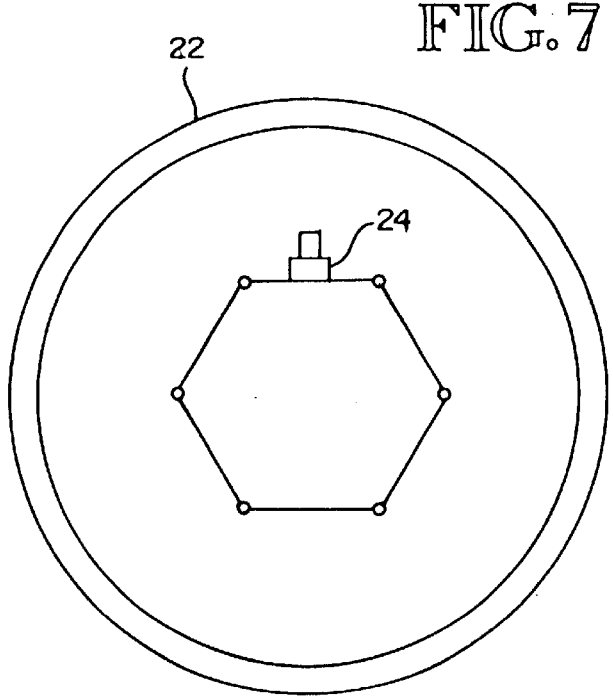
FIG. 7 is a sectional view of the cylindrical gripping device with the identification sensors mounted within a hexagonal core.

Reference is now had to FIG. 7, which depicts a more permanent dedicated installation including a rigid or semi-rigid transparent cylindrical outer shell enclosing a plurality of light-emitting/detecting strips 24, as described hereinafter, mounted with a rigid coaxial structure such that the light and the detectors broadcast outwardly toward the shell and therefore can read the subcutaneous structure of a hand grasping the shell 22.

Figure 8:
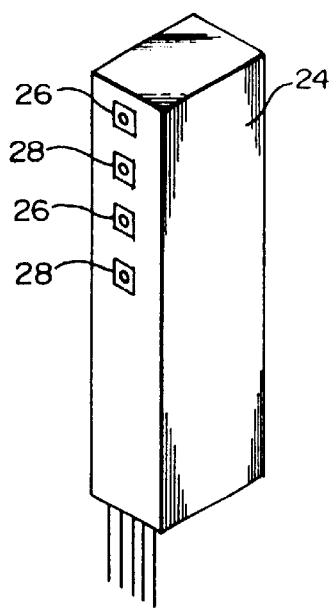
FIG. 8 is an isometric view of an individual identification element.

As seen in FIG. 8, an individual strip 24 can be seen with alternating LEDs 26 and detectors 28, such that the individual unit 24 can be snapped into place and the traces appropriately connected so that the device can read the grasping hand, transmit the information to a prerecorded standard, and the comparison can be made.

Figure 9:
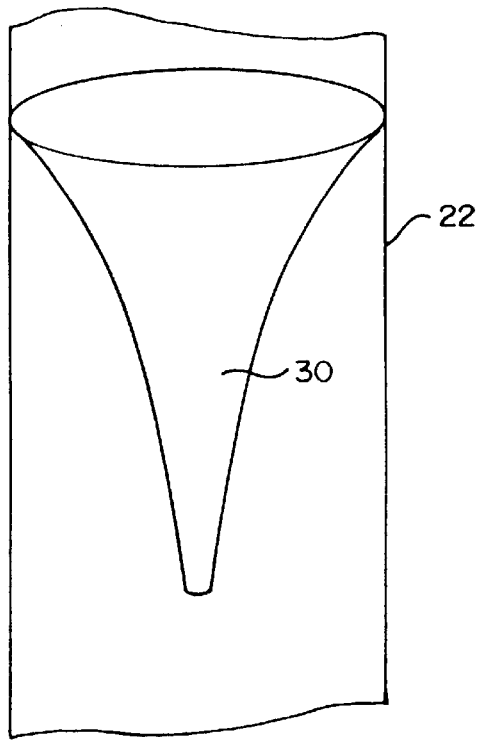
FIG. 9 is a view of a mirrored surface which would allow the reading of the subcutaneous structure of a grasping hand from the bottom of a cylindrical grasped element.

FIG. 9 depicts yet another possible method of utilizing the inventive phenomena, wherein the exterior shell 22 includes an upwardly and outwardly smoothly curved and flared mirror surface 30, such that the light transmitted from the bottom of the tube is reflected off of the surface to the grasping hand, and likewise the receiver distance is the same, such that the result is the same as if the array was equidistant from the hand contacting the exterior surface.

Figure 10:
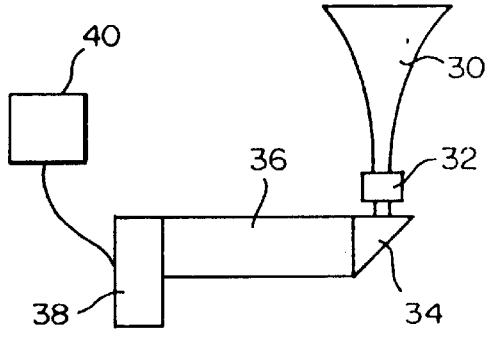
FIG. 10 is a partial schematic illustrative of a possible use of the structure of FIG. 9.

FIG. 10 is a schematic view of the system utilizing the structure of FIG. 9, which filters the read material through the light reflected by mirrored surface 30 which travels through an optional Gren lens 32 through a prism 34 transmitted by a fiber-optic bundle 36 to a charge couple device 38 for further processing by the comparative computer 40.

Thus, as can be seen, the current invention provides a simple, reliable method of performing identity comparison in one embodiment and in another embodiment provides a flexible, large active area which has a very thin cross-section and has simple optical and electrical characteristics with an integral light source using an array of leds to adapt to essentially any surface which can use a contact-imaging surface.

What is claimed is:

1. An identification system for determining an individual's identity, comprising:
   a hollow, elongated, transparent element capable of being grasped as a unit by the human hand;
   a plurality of light sources within the transparent element emitting a light passing through the transparent element capable of illuminating subcutaneous material;
   a plurality of devices within the transparent element capable of reading the material illuminated; and
   means interconnected with the reading devices for comparing the current reading with a pre-recorded standard.

2. A device for non-invasive reading of subcutaneous material of a living organism, comprising:
   a flexible mat of a predetermined size to which are secured:
   a grid of light-emitting elements of a wavelength capable of penetrating the skin of the organism;
   a grid of light-detecting elements capable of reading the objects illuminated by the grid of light-emitting elements; and
   means interconnected with the light-detecting elements to record that which is illuminated.

3. A device as in claim 2, wherein the light-emitting elements and the light-detecting elements are located on separate layers of a multilayered mat.

4. A device as in claim 2, and further including means to prevent cross-reading of the illuminated images.

5. A device as in claim 2, wherein the data recorded is compared to prerecorded and stored data for identification.

6. An identification system for determining an individual's identity, comprising:
   an elongated, transparent object capable of being grasped by the human hand;
   a plurality of light sources within the transparent object emitting a light capable of illuminating subcutaneous material;
   a plurality of devices within the transparent object capable of reading the material illuminated wherein the light sources and reading devices are alternately placed along a strip inserted into the transparent device; and
   means interconnected with the reading devices for comparing a current reading with a prerecorded standard.

7. An identification system as in claim 6, wherein the light sources and reading devices are located along a plurality of strips within the transparent device.

* * * * *